Aug. 10, 1965   R. S. FARR   3,199,488
DUST AND LIQUID DETECTOR
Filed April 9, 1963
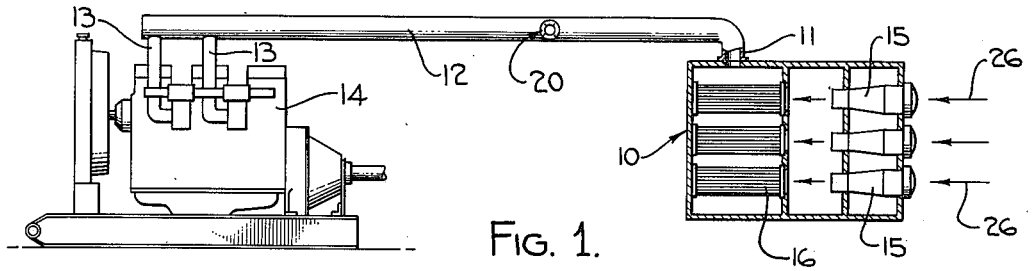
FIG. 1.
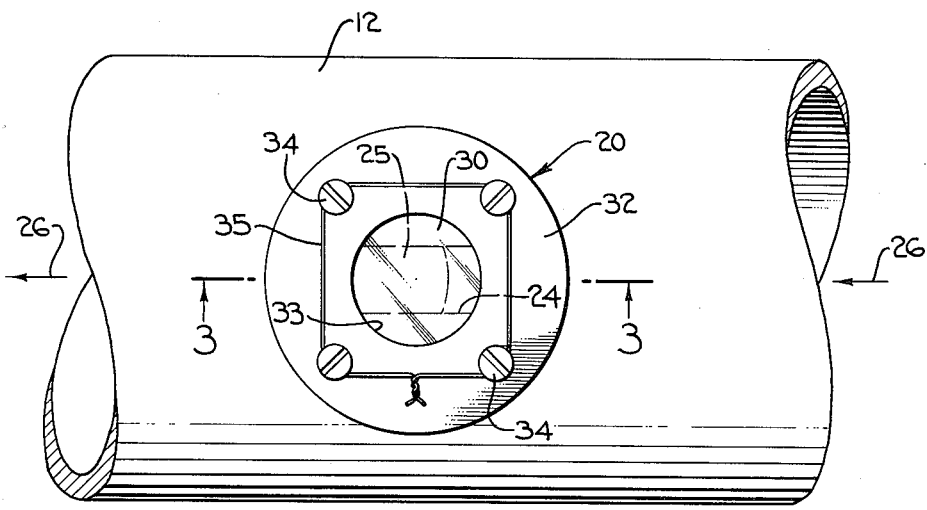
FIG. 2.
FIG. 4.
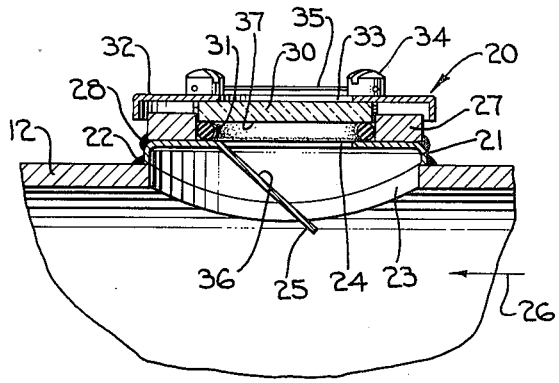
FIG. 3.
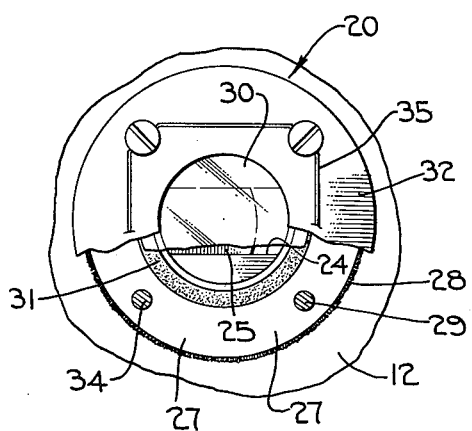
RICHARD S. FARR
INVENTOR.
BY *Lyon & Lyon*
ATTORNEYS.

United States Patent Office 3,199,488
Patented Aug. 10, 1965

3,199,488
DUST AND LIQUID DETECTOR
Richard S. Farr, Los Angeles, Calif., assignor to Farr Company, El Segundo, Calif., a corporation of California
Filed Apr. 9, 1963, Ser. No. 271,787
6 Claims. (Cl. 116—114)

This invention relates to a device for visually detecting the presence of dust or other solid particles and liquid droplets present in a gaseous fluid flowing through a conduit and, in particular, is directed to such a device for permitting visual observation of an indication of the quantity of dust, solid particles and liquid that has been permitted to pass a filter over a known period of time.

There are numerous devices and systems which require the filtering of air or other gas used in such device or system to remove dust, particles or liquid from the air or gas either for purifying such air or gas or for extracting and recovering such dust, particles or liquid. For eaxmple, internal combustion engines are usually provided with an air filter on the intake to the engine thereby remove dust and other solid impurities from the intake air which, in excessive quantity or concentration, otherwise would cause damage or excessive wear to the engine. Basically, there are two types of filters that are generally employed for filtering intake air to an engine and these types are broadly known as "oil bath filters" and "dry filters." Oil bath filters are periodically serviced by merely changing the oil and a skilled operator may readily determine when the oil needs changing by observing the cleanliness of the oil during periodic maintenance. However, with dry type air filters, it is not always possible to determine whether or not the filter is functioning adequately and efficiently by mere observation of the filtering element of elements.

These dry type air filters have been found to have many advantages such as the long useful life of the filter without requiring periodic maintenance as is required with oil bath type filters. However, the useful life of these dry type filters is not accurately predictable since variation in operating conditions will greatly vary the useful life. Moreover, if a dry type filter becomes damaged or malfunctions, this will not be readily apparent or observable and, therefore, the air filter will permit dust and other solid impurities to pass unnoticed to the intake of the engine. Under extremely adverse supply air conditions, such as is encountered with road-working equipment, the large quantity of dust that will pass through the intake of the engine when a dry type air filter is damaged or malfunctions can cause irreparable damage and wear to the engine. As a result of these inaccuracies in determining the full useful life or a malfunctioning of a particular dry type filter, these filters have not been completely accepted by the industry although generally accepted to be a more effective and desirable filter in other respects.

There are also systems where dust is bing extracted from flowing gas due to the value of that particular dust and the gas is then merely exhausted. Many such systems employ dry type filters and any malfunctioning of the filter which permits the dust to bypass the fiilter results in an irretrievable loss. As mentioned above, the useful life or malfunctioning of dry type filters has not heretofore been immediately determinable during operation and therefore the quantity of valuable dust that may be lost may be substantial.

With oil type filters and with filters that are employed for eliminating liquid droplets from a flowing gaseous fluid it is often desirable to be able to obtian an indication of the quantity of oil that is being entrained in the filtered gaseous fluid by the oil bath filter or of the quantity of liquid droplets that are being allowed to pass through the liquid eliminating filter. When an excessive quantity of oil or liquid passes such filters it may be possible to adjust the rate of gas flow or make other changes for eliminating the excessive oil or liquid, but conventionally there is no means provided for continually giving such an indication.

Accordingly, by this invention, there is provided an element which extends into the stream of flowing air or other gas at a location downstream from a filter and that element is visible from outside the conduit, whereby the quantity of dust or liquid droplets that is impinging on such element or has collected thereon gives an indication of the total quantity of dust or other impurities that is then flowing through the conduit or has heretofore flowed through the conduit. In this manner any unusual functioning or ineffectiveness of the filter is immediately indicated and observable so that proper maintenance or adjustment of the filter may be accomplished.

An object of this invention is to provide a novel form of detecting device for use with gaseous fluid carrying conduit for permitting visual observation of an indication of the quantity of dust or liquid droplets being conducted through such conduit.

Another object of this invention is to provide an inexpensive detecting device which is particularly adaptable for use with a dry air filter for producing an immediate indication of the filtering effectiveness of such filter without requiring removal and/or inspection of the air filter.

A further object of this invention is to provide a device for detecting the presence of dust or liquid droplets in air flowing through a conduit, wherein an element extends into the air flow at an acute angle in the upstream direction and is visible through a transparent means for observing the dust or liquid impinging and accumulating on the element.

A still further object of this invention is to provide such a device wherein the position of such element causes air to flow in the direction of and impinge on a transparent member whereby dust or liquid droplets will be observable and accumulate on such transparent member.

Other and more detailed objects and advantages of this invention will appear from the following description and the accompanying drawings.

In the drawings:

FIGURE 1 is a schematic illustration of a typical installation employing a dry type air filter for filtering the intake air to an internal combustion engine.

FIGURE 2 is an elevation view of the dust-detecting device of this invention installed on an air conducting conduit such as the conduit extending from the air filter to the engine shown in FIGURE 1.

FIGURE 3 is a fragmentary sectional view taken substantially on the line 3—3 as shown in FIGURE 2.

FIGURE 4 is a fragmentary elevation view of the device of this invention with portions broken away for illustrating the construction of the device.

It is to be noted and will readily appear to those skilled in the art that while the device of this invention is specifically illustrated and hereinafter described as being associated with the intake of an internal combustion engine and a dry type filter, the device may be used in other gaseous fluid systems and with other types of filters with equal success and without departing from this invention. Further, although in the described environment the device of this invention detects dust, it will readily appear that the device will detect droplets of liquid in a like manner.

Referring now more particularly to FIGURE 1, a dry type air filter assembly 10 is shown having an outlet 11 connected to a manifold or conduit 12 extending to the intake manifolds 13 of an internal combustion engine 14 for supplying filtered air to the intake of engine 14. Filter 10 may be of any conventional type such as the type that employs a plurality of cyclone type filters 15 that remove a portion of dust and other solid impurities contained in the incoming air by passing the air through a tortuous path to discharge the dust and solid impurities. The filter 10 may then have a plurality of porous material filters 16, such as conventional cylindrical pleated paper filters, for receiving the air from cyclone filters 15 and discharging the air to the outlet 11 of the filter. By way of illustration, it is to be noted that without the device of this invention, in order to detect a damaged filter element 16 that is permitting dust to pass to engine 14 it would be necessary to disassemble air filter 10 and closely inspect each filter 16. If such a periodic maintenance inspection were necessary to protect engine 14 the cost of operation would discourage the use of a dry type air filter 10.

In order to detect the presence of dust and other solid impurities in the air flowing through conduit 12, the dust detector device, generally designated 20, is provided and associated with conduit 12. A saddle shaped frame 21 is provided with device 20 and is adapted to be secured to conduit 12 by any convenient means such as welding 22. Frame 21 is secured over an aperture 23 provided in the wall of conduit 12. Frame 21 is provided with a central aperture 24 therethrough and an element 25 extending into the conduit 12. As shown in the drawings, element 25 may be in the form of a generally rectangular tab. Element 25 extends into conduit 12 at an angle to the axis of conduit 12, i.e., at an angle to the direction of air flow through conduit 12, and in an upstream direction relative to the air flow. The direction of air flow is indicated by arrows 26.

A ring 27 is secured to saddle shaped frame 21 by any convenient means such as welding 28. Ring 27 is provided with a plurality, four shown, of tapped holes 29. A circular transparent member 30, such as glass or plastic, is positioned within ring 27 and supported on frame 21 by a resilient sealing ring 31. An annular cap 32 having a central aperture 33 is adapted to fit over transparent member 30, ring 27, and frame 21, and be secured to ring 27 by means of a plurality of machine screws 34. By tightening machine screws 34 the transparent member 30 is urged downwardly against the resilient sealing ring 31 to form an air tight seal between the transparent member 30 and frame 21. The heads of machine screws 34 may be provided with lateral holes for receiving a conventional locking wire 35 to prevent inadvertent releasing of machine screws 34 or tampering with the dust detector device 20. Thus, it may be seen that the upper surface 36 of element 25 is visible through the transparent member 30 and surface 36 faces the stream of air flowing through conduit 12. It is preferred that surface 36 be appropriately coated such as with white paint so that any dust or solid impurities passing over or accumulating on surface 36 are already visible.

As air flows through conduit 12 in the direction of arrows 26 any dust or other solid impurities present in the flowing air will normally be relatively well distributed across the cross-section of conduit 12. As the flowing air encounters element 25 that portion of the air will be rapidly diverted in a somewhat upward direction toward transparent member 30 as viewed in FIGURE 3. Some of the air of course will bypass around the sides of element 25. The rapid change in direction of air flow caused by element 25 will cause some of the dust or other solid impurities present in that flowing air to impinge upon surface 36 and some of such dust or impurities will adhere thereto at least temporarily. Further, the air that is diverted toward the inner surface 37 of transparent member 30 may also contain dust or other solid impurities and when the flowing air impinges on surface 37 at least a portion of such dust or impurities will come to rest on surface 37.

The dust and other solid impurities impinging on surface 36 of element 25 and surface 37 of transparent member 30 will be readily visible and observable and the quantity of such dust and impurities will give a relative indication of the quantity of dust and solid impurities flowing through the entire conduit 12. Thus, mere visual observation through transparent member 30 will give an immediate indication to an operator as to whether or not air filter 10 is functioning properly. Moreover, a certain portion of the dust and solid impurities impinging on surfaces 36 and 37 will be retained thereon for an indefinite period of time and therefore the quantity of such dust and impurities that has passed through conduit 12 since installation of device 20 or the latest cleaning of surfaces 36 and 37. Since a properly operating dry type filter 10 will permit a certain small percentage of fine dust to pass therethrough, if surfaces 36 and 37 of device 20 are cleaned when filter 10 is installed or cleaned, then the last-mentioned accumulation of dust and impurities on surfaces 36 and 37 will produce an indication of the cumulative conditions and time of operation of filter 10. Thus, an operator may determine whether or not the filter 10 is due to be replaced or maintenance performed even before filter 10 begins functioning improperly. Further, it is to be noted that since element 24 only extends into a small portion of the cross-section of conduit 12, there is no substantial or permanent obstruction to the normal flow of air through conduit 12.

When device 20 is used in a conduit for detecting moisture or liquid droplets in the gaseous fluid, such as downstream from an oil bath filter or moisture eliminator, it is to be noted that such moisture or droplets will also impinge on surface 36 of element 25 and possibly on transparent member 30 to thereby become visible.

Device 20 may also be employed to detect the presence of valuable dust in the exhaust gas of a system for recovering such dust and will function in the same manner as heretofore described. When device 20 is so used, surface 36 may be coated a more appropriate color than white for producing a background that will contrast with the predominant color of that particular valuable dust and therefore make the presence of the dust more readily observable.

Although I have described my invention as being comprised of a frame, ring, cap, element, transparent member, etc. of particular configurations, it will readily appear to those skilled in the art that various substitutions and modifications of these components may be made without changing the operation and function of the device of my invention. Having fully described my invention, it is to be understood that I do not wish to be limited to the details herein set forth or to the details illustrated in the drawings, but my invention is of the full scope of the appended claims.

I claim:

1. A device for detecting solid or liquid particles in a gas flowing through a conduit comprising a transparent member for mounting in sealed relation with an aperture in the conduit, an element for mounting in the conduit and having a surface positioned at an obtuse angle to the direction from which the gas is flowing for the particles to impinge upon said surface, said element and surface of relatively narrow lateral width compared to the conduit width for minimizing the obstruction to normal gas flow formed thereby, and said element positioned and oriented within the conduit with said surface visible through said transparent member whereby the particles impinging on said surface are observable.

2. A device for detecting solid or liquid particles in a gas flowing through a conduit comprising a transparent member for mounting in sealed relation with an aperture in the conduit, and an element for mounting in the conduit and having a surface observable through said transparent member, said element and surface of relatively narrow lateral width compared to the conduit width for minimizing the obstruction to normal gas flow formed thereby, said surface positioned at an angle to the direction of gas flow for diverting the gas flow toward said transparent member and causing the particles to impinge upon said surface and said transparent member whereby some of the particles come to rest momentarily and are observable.

3. A device for detecting solid or liquid particles in a gas flowing through a conduit comprising a transparent member mounted in sealed relation with an aperture in the conduit, an element mounted on the conduit and extending a small distance inside of the conduit to a position in the path of a portion of flowing gas, said element positioned adjacent the conduit aperture and having a surface observable through said transparent member, said element and surface of relatively narrow lateral width compared to the conduit width for minimizing the obstruction to normal gas flow formed thereby, said surface positioned at an obtuse angle to the direction from which the gas is flowing for the particles to impinge upon said surface and for diverting the gas flow toward said transparent member for causing the particles to impinge thereon whereby the particles impinging on said surface and said transparent member are at least momentarily observable.

4. A device for detecting solid or liquid particles in a gas flowing through a conduit comprising a transparent member for mounting in sealed relation with an aperture in the conduit, an element for mounting in the conduit adjacent the aperture and having a surface extending into the path of flowing gas, said element and surface of relatively narrow lateral width compared to the conduit width for minimizing the obstruction to normal gas flow formed thereby, said surface being relatively flat and positioned at an obtuse angle to the direction from which the gas is flowing for the particles to impinge upon said surface, said surface coated a color for contrasting with the particles to be detected, and said element positioned and oriented within the conduit with said surface visible through said transparent member whereby the particles impinging on and passing over said surface are observable on said color coated background provided by said surface.

5. A device adapted to be mounted over an aperture in a conduit for detecting solid or liquid particles carried in gas flowing through such conduit, the combination of: a frame for fitting over the conduit aperture and being secured to the conduit, said frame having an element extending through said conduit aperture a small distance into the conduit, said frame having an aperture adjacent said element, a transparent member sealably engaging said frame and closing the said frame aperture, a cap having a central aperture and positioned over said transparent member, means securing said cap to said frame to releasably secure said transparent member to said frame in sealing relation, said element having a flat surface extending at an angle to the direction of gas flow, said surface extending inwardly in an upstream direction and being visible through said transparent member whereby some of the flowing gas is diverted by said surface of the element toward said transparent member to cause some of the particle to come to rest at least momentarily on said surface and said transparent member and are observable through said transparent member.

6. A device adapted to be mounted over an aperture in a conduit for detecting solid or liquid particles carried in gas flowing through such conduit, the combination of: a frame for fitting over the conduit aperture and being secured to the conduit, said frame having an element extending through said conduit aperture a small distance into the conduit, said frame having an aperture adjacent said element, a transparent member sealably engaging said frame and closing the said frame aperture, a cap having a central aperture and positioned over said transparent member, means securing said cap to said frame to releasably secure said transparent member to said frame in sealing relation, said element having a flat surface extending at an angle to the direction of gas flow, said surface being coated a color for contrasting with the particles to be detected, said surface extending inwardly in an upstream direction and being visible through said transparent member whereby some of the flowing gas is diverted by said surface of the element toward said transparent member to cause some of the particles to come to rest at least momentarily on said surface and said transparent member and are observable through said transparent member.

References Cited by the Examiner

UNITED STATES PATENTS

| 1,274,415 | 8/18 | Hill | 73—28 |
| 2,580,928 | 1/52 | Kehm | 116—117 |

FOREIGN PATENTS

| 455,026 | 1/28 | Germany. |
| 908,410 | 10/62 | Great Britain. |

LOUIS J. CAPOZI, *Primary Examiner.*